Figures 1, 2:
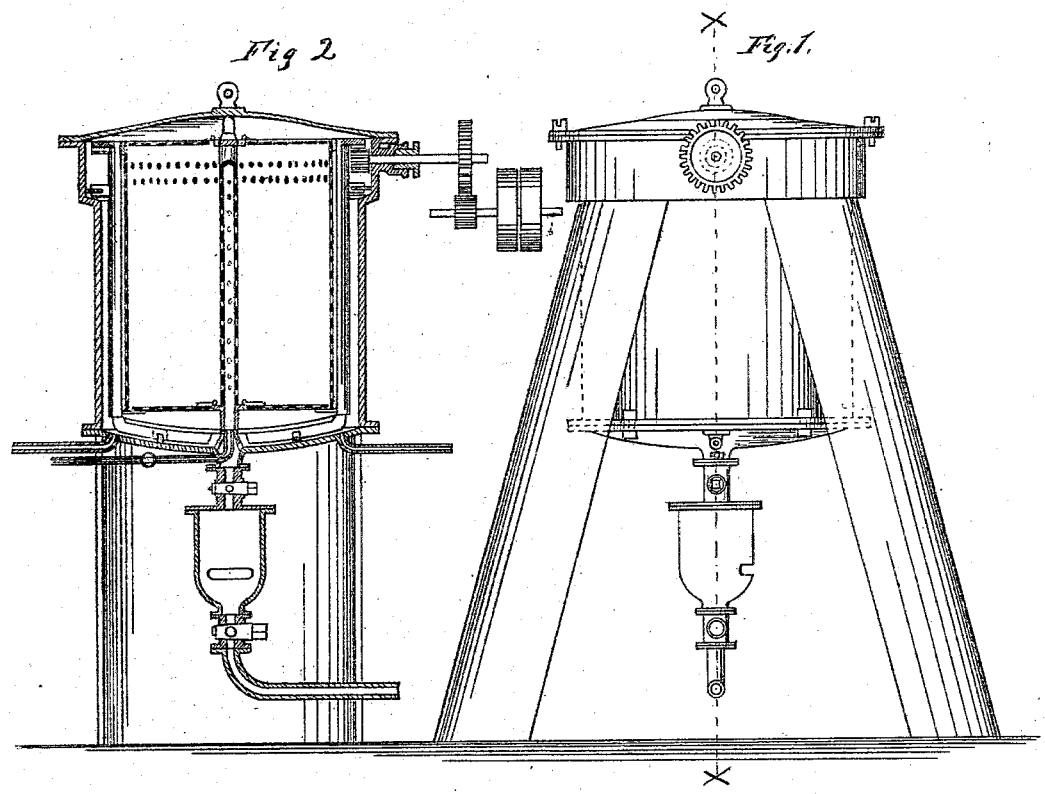

J. DENIS.
PREPARATION OF PAPER PULP AND MANUFACTURE OF PAPER.

No. 113,502. Patented Apr. 11, 1871.

Witnesses

Inventor:
J. Denis

J. DENIS.
PREPARATION OF PAPER PULP AND MANUFACTURE OF PAPER.

No. 113,502. Patented Apr. 11, 1871.

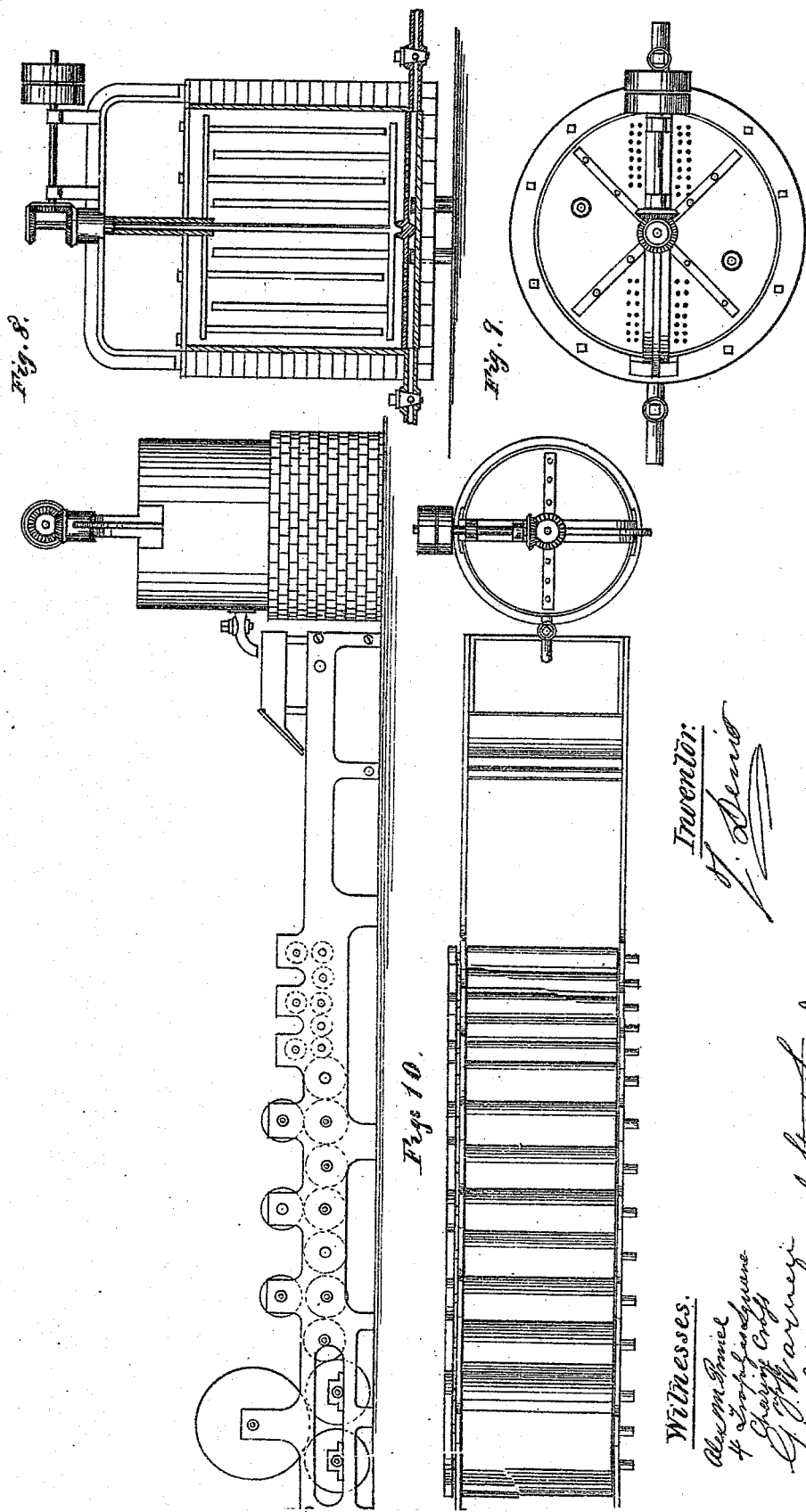

United States Patent Office.

JULIEN DENIS, OF STAMFORD STREET, BLACKFRIARS, GREAT BRITAIN

Letters Patent No. 113,502, dated April 11, 1871; antedated March 24, 1871.

IMPROVEMENT IN THE PREPARATION OF PAPER-PULP AND MANUFACTURE OF PAPER.

The Schedule referred to in these Letters Patent and making part of the same.

*To all whom it may concern:*

Be it known that I, JULIEN DENIS, of Stamford Street, Blackfriars, in the county of Surrey, in the United Kingdom of Great Britain, merchant, have invented certain "Improvements in the Treatment and Preparation of Fibrous Substances or Vegetable Matters as Pulp for the Manufacture of Paper, and in Apparatus for the same;" and I do hereby declare the following to be a full, clear, and exact description of the same, reference being had to the accompanying drawing and to the letters of reference marked thereon.

My invention relates to improvements in the treatment of fibrous substances or vegetable matters, such as textile plants, for the purpose of converting them into pulp for the manufacture of paper, and also in the apparatus or machinery employed therein.

The invention consists in the adoption of new machinery, pans, vats, and arrangement of the same as half-stuff for paper-mills, in a new chemical composition for the boiling, which destroys the gums, resins, oils, and fecula without damaging the fibers of the plants; in the extraction, by means of new compositions, of hydrochloric, sulphuric, and nitric acids, and of the sulphates of iron, copper, and tin which are contained in the plants; in new combinations of chlorine, which are so reduced in strength that they may be heated to 110° Fahrenheit, without danger to the tenacity of the fibers; in the application of a chemical agent to disinfect the matters and neutralize the acids; and in the method of treatment which insures the production of greater quantity of good and fine pulp for paper.

The following are the plants best suited for this improved treatment, but others might be enumerated:

The species most difficult to treat are the *esparto*, Spanish rush, broom, dwarf, and other palms; diss, formuitenas, wild hemp of Africa, bamboo, all kinds of indigenous and exotic rushes and reeds; the wild flax of Africa; the barks and wood of certain trees, such as cabbage-trees, *mahout penaint, mahout venant,* lime, willow, ash, and mulberry-trees, plantain; and the easiest to treat, requiring only one-half or two-thirds of the quantity of the chemicals necessary for the above.

Some of the finer kinds are the *agrostis littoralis*, maize, *yucca glorissa, yucca filamentosa,* colza, ananas or pine-apple, *elemies arenarious, elemies giganteous,* sugar-cane residue, the native flax, straw and flax waste, and all sorts of straw and wood which contain fiber.

The wood is prepared by a proper machine into shavings previous to undergoing the treatment described in this specification.

I wish especially to claim the treatment of the *agrostis littoralis* a native plant of an almost unlimited supply, which requires milder treatment, since one-half the quantity of the ingredients in the composition of the baths is sufficient for the boiling, which requires only two hours, the sal ammoniac being totally omitted.

The chemical ingredients employed to combine with the chlorine and acids are potash or soda, sulphate of soda, nitrate of soda, carbonate of soda, sulphate of potash, salt of ammonia, carbonate of ammonia, carbonate of potash, carbonate of lime, silicates, carbonates, phosphates, sulphates of ammonia, hypochloride of lime, bicarbonate of potash, and all chemical products and matters which contain carbonic acid, carbon, mineral, vegetable, and animal alkalies possessing bleaching properties applicable to my present invention.

I will now proceed to describe the various operations of treatment on a quantity of raw material equal to one ton, which will produce about twelve hundred-weight of fine bleach half-stuff or pulp; but, of course, any other quantities can be treated by proportionate apparatus and chemical ingredients.

The machinery for the first operation is shown in figs. 1, 2, 3, 4, and 5 of the drawing annexed.

Figure 1 is an elevation of the boiler, and

Figure 2, a vertical section of the same with rotary apparatus inclosed.

Figure 3:
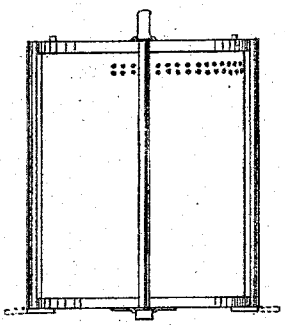
Figure 4:
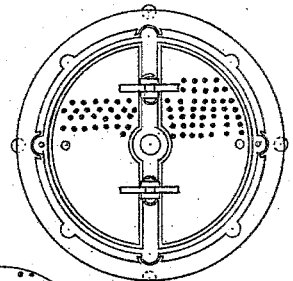
Figure 5:
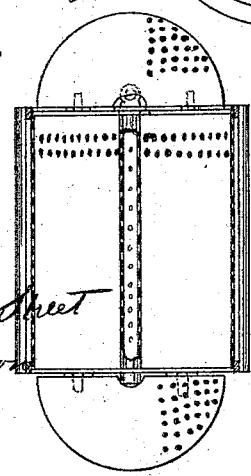

Figure 3 is an elevation of the perforated revolving cage;

Figure 4, a plan of the top of revolving frame and cage showing perforated cover; and Figure 5, a section of cage and cover.

The boiler or boiling-pan is made of iron or any suitable metal, and is of round oblong form, egg or dish-shaped at the bottom, with a lid or cover, having a small-self-acting valve at the top to close or shut the surface of the boiler.

Inside the boiler is fitted a revolving frame of particular form, adapted to receive a cage which is made of perforated iron, to fit in and out of the frame. The cage is to contain the raw material which is to be boiled.

Four scrapers are fixed at the bottom of the frame to send the residuum down.

At the bottom of the boiler is fixed a small egg or dish-shaped receiver, for the residue or deposits produced by the boiling of the material.

A valve is fixed in a junction-pipe connecting the boiler and the receiver, to shut and open, as required.

A cock is attached to the bottom of the receiver to empty it, and a small side door is added, to be used when it requires cleaning.

The boiling is effected by a steam-pipe fixed at the bottom of the boiler, having several jets forcing steam through the material as the cage revolves over it.

The frame and cage is put in motion by proper wheels and pinions, or by a strap, during the boiling.

By this means the material travels through the boiling liquid, receiving a perfectly uniform boiling, and at the same time causing the fibers to be washed clean from the injurious matters contained in the plants, which matters are precipitated to the bottom of the boiler, and then to the receiver. By this mode of boiling one-half the usual time, fuel, and labor are saved.

The lye is not removed from the boiler, being usable several times by adding one-half of the chemicals required and a sufficient quantity of water for a fresh boiling.

The cover of the boiler is removed by a crane or rope and pulley fixed above. The cage is also moved in and out of the boiler by a traveling crane, and taken to be emptied and refilled with the material to be boiled.

Figure 6:
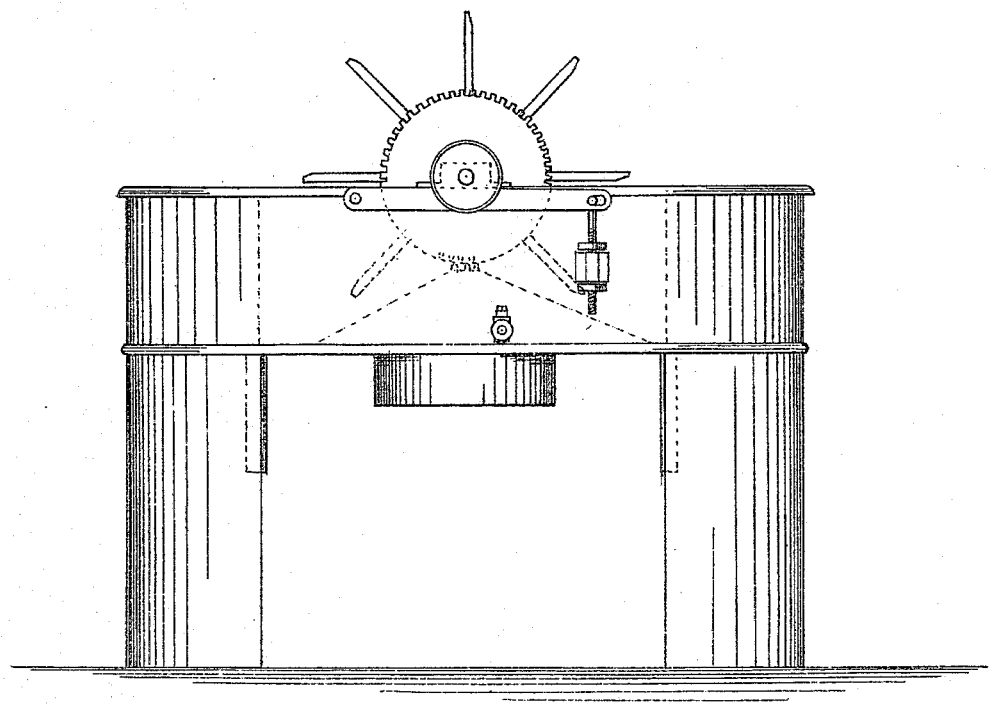
Figure 7:
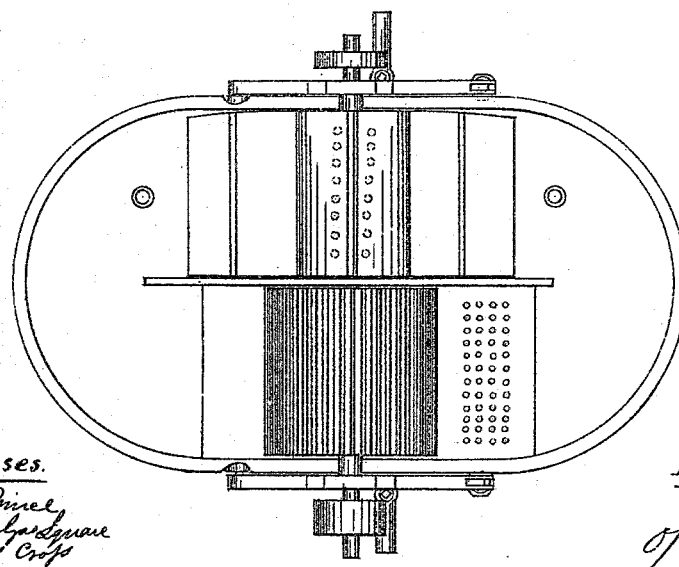

The machinery of the second operation is shown in figs. 6 and 7—

Figure 6 being a side elevation, and

Figure 7, a plan.

It consists of a pulping or breaking-engine, to wash five hundred-weight, more or less, of the material at each time, made of iron or any suitable material.

In this pulping-machine there is a platform or rising piece under the cylinder, on which is placed a purifying-plate.

A dashing-wheel is placed on the opposite side of the cylinder to push forward the stuff under question.

A drainer is at the bottom of the engine under the dashing-wheel, an inlet and outlet with valves for the washing-water at the top of the engine; also plugs and pipes at the bottom to empty the stuff into the acidulating or bleaching-vat.

The machinery of the third and fourth operation is shown in Figures 8 and 9, which are a section and top plan view. They represent the arrangements for the acidulating and bleaching-vats.

The acidulating-vat is of round form, about six feet deep, according to the quantity to be treated each time. This vat is made of bricks, stone, slate, cement, or any suitable material, with an inlet and outlet or valve at the top for the washing-water, two plugs and pipes, with a drainer at the bottom. It is provided with an agitator coated with India rubber or gutta-percha, with a glass bush or foot-step let into stone at the bottom of the vat, (or a cage might be made to fit into this vat,) for the purpose of removing the fibers in and out of the bath with the crane. The agitator can be made with a certain kind of wood or other material which will stand the action of the acid. Motion is given to the agitators and dashers in the different vats by suitable external gearing.

For bleaching, the vat is also of round form, four to six feet deep, and composed of bricks, stone, slate, cement, wood, or other suitable material; double or reversed-motion revolving dashers fixed on the top of the vat by a revolving frame; an inlet and outlet-pipe, with valves for the washing-water, are provided; also, two plugs and pipes, with a drainer at the center of bottom of vat; a cock at each end of the drainer; also a drainer forming a cover for the vat; a steam-pipe with cock is fixed within twelve inches from the top, communicating with a steam-boiler; also a pipe for a blast of hot or cold air.

The machinery for the fifth operation is shown in Figures 10 and 11, which are a plan and elevation of the pulp-pressing and drying machinery. It consists of a large round chest, made of wood or other material, with a single agitator to receive all the half-stuff from the bleaching-vats, and to empty it by proper valves on the pressing and drying-machine, which is composed of an iron frame and an endless metallic cloth; one, two, or more pairs of solid rollers to press the water out of the pulp; then a series of hollow steam-rollers, through which the pulp travels till perfectly dry. A cutting apparatus is fixed at the end of the drying-machine for the purpose of cutting the pulp in large sheets.

All the machinery is set in motion by steam or water-power. The rollers are heated by pipes from a steam-boiler.

In the erection of the above-described new machinery a proper foundation may be put down, with two external strong walls and one center arched wall. One side of the building is left open from floor to roof, and contains the boiling-pans and acidulating-vats, over which is erected a traveling crane for lifting the materials into boilers and vats, small jib-cranes being provided for lifting the covers of the boilers. On the other side of the central wall is arranged the washing pulping-engines, the bleaching-vats, the receiving-chests, and drying-machine. A cistern forms the roof of this part of the building, for the supply of the washing water. At one end of that part of the building a laboratory is provided, with proper vats, alkali boilers, and utensils for the preparation of the chemical baths, to be sent by pipes with suitable cocks or valves to the different pans and vats for the operations.

At the bottom of the building there should be several large tanks to receive the liquid after use. At one end of the building a shed is provided to receive and store the raw material and fill up the cages to be removed by the crane. The shed at the other end of the building is for packing and storing the half-stuff to be sent to customers. The coal-shed is at the back of the building; and, to put up the steam-boilers, pumps and pipes are put up for the pumping of the liquid which has been used from the receiving-vats at the bottom of the building to the laboratory. The mill can be erected in the form of a T, with the boilers at one end of the building.

*First Operation.*

Steeping and weight of raw material and ingredients of such, one of the most difficult plants to treat. For every ton of raw material I put into the boiling pan a bath of liquid lye prepared as follows:

I dissolve in about two hundred gallons of hot water one hundred and seventy-five pounds of carbonate of soda or alkali, fifty-six pounds of sulphate of soda, forty pounds of sal ammonia. When the dissolution is perfect I throw in fifty gallons of chlorine at 2° of the acidimeter Beaumé. I put one hundred and fifty pounds of quick-lime to dissolve in cold water, which is allowed to settle and draw clear, and put it in the bath. Care should be taken that the lye be about six inches from the top of the pan when the raw material is put in, as the steam which condenses in the pan often produces too much water. The liquid must cover the raw material by adding sufficient water. If the lye does not cover it the lid is shut down to keep in the steam.

The mass is to be boiled for four, six, or sometimes eight hours, according as the material may be more or less difficult to reduce.

*Second Operation.*

When the materials are well boiled I take them out of the boiler in the cage by the traveling crane, and deliver into suitable receptacles. The ton of material is divided into four washing-cylinders, each washing five hundred-weight in passing through the cylinders, which reduces them to fibers of three or four inches in length. They are washed at the same time with pure water entering through a suitable cock or valve, which water is carried off by an outlet drainer or by the use of a drum-washer, one to two hours being sufficient for this operation. The materials are then sent down through the plug into the acidulating-vat for further treatment.

Third Operation.

Textile plants generally contain sulphate of iron and copper; which, as long as they exist in the plant, render the bleaching not only very difficult but very costly, besides weakening the fiber by destroying the nerves. I neutralize the sulphate of iron and copper as follows:

I make a bath in the laboratory of muriatic, sulphuric, or nitric acid, marking 2° of Beaumé's acidimeter, and then add to the bath about twenty pounds of marine salt, salt of niter, or nitrate of soda, for every ton of raw material which has been placed in the acidulating-vat from the second operation. This bath is well worked up and thrown into the vat over the material. It is necessary that the material in the bath should not be too thick, so that the agitators may work it well so as to separate it in the bath. Two hours in this bath is sufficient, after which the liquid is to be withdrawn and used again, by adding one fourth of the quantity of the ingredients at each time, which will be sufficient to obtain the two degrees required. After this the pulp should be washed in the vat and sent down to the bleaching-vat to undergo the next operation.

Fourth Operation.

I make a bath in a suitable vessel in the laboratory, as above, of liquid chlorine marking $1\frac{1}{2}°$, and in certain instances it might be 2° of Beaumé's acidimeter, to well saturate the pulp from the third operation, which is the produce of one ton of raw material.

I dissolve in sufficient quantity of hot water forty pounds of subcarbonate of soda, sulphate of soda, nitrates, phosphates, azotates, silicates, aluminates, carbonate of lime, or any chemical products which are soluble and contain carbonic acid or azote, and which have some power of decolorization, which I add to the chlorine to neutralize its acidity.

I heat the bath to a temperature of 70° to 90° Fahrenheit without injury to the material, although it is well known by paper-makers that they could not hitherto heat the chlorine even to 50° Fahrenheit without burning the fibers submitted to its action.

When the bath is prepared as above, and is thrown over the material which is in the bleaching-vat, the agitator is put in motion and the steam sent in through the bath, and the material being agitated all the time.

When getting up the heat two or three hours is sufficient for this operation, taking care to agitate every half hour for ten minutes, after which the liquid is withdrawn and used again for the steeping of the first operation instead of pure water and the chlorine at 2°. I now wash the material in the vat and draw the water from it. This pulp is white enough for most paper. The blast of air is to be put on during each agitation.

I make a bath similar to the last, with the exception that it marks 2° Beaumé, and is composed of one part of chlorine and one part of carbonate or crystal of soda.

The material is allowed to remain about four hours, stirring four or five times, about ten minutes each time. The blast of cold or hot air is put on during the agitation, after which the solution is drawn off and used again for the fourth operation, by the addition of one-fourth of the chemicals used to make a fresh bath for the fourth operation. This pulp is well washed in the bath, and will form a very superior white pulp or half-stuff, which is then sent down by opening the plug to the receiving-chest, and from thence onto the drying-machine. If the paper is made at the mill where the pulp is manufactured it should be delivered in the beaters instead of the receiving-chest.

As certain textile plants are more or less difficult to disinfect and neutralize the acids, as well as to prevent the pulp or paper subsequently turning yellow before the pulp leaves the vat, the ingress and egress of the water are then shut, and the mixture of forty gallons of water and thirty ounces of protochloride of tin is thrown over the material and agitated for ten minutes, and then washed for about a quarter of an hour for the purpose of decomposing the acid and disinfecting the pulp.

Having now described the nature of my said invention and the manner of performing the same,

I claim as my improvements in the preparation of vegetable matter as a pulp for the manufacture of paper—

1. The new machinery, pans, vats, and drying-machine hereinbefore described, for the conversion of textile plants into pulp.

2. The arrangement of the machinery and the particular building for the said machinery.

3. The baths of chlorine combined with carbonated agents containing, among others, carbonic acid, and which are used in a heated state.

4. The treatment of textile plants by means of hydrochloric and sulphuric-acid baths, combined or not with nitrate of soda.

5. Protochloride of tin to neutralize the acids and disinfect the pulp.

6. Generally the method of proceeding in converting textile plants into brown or white pulp for paper, hereinbefore described, especially the *agrostis littoralis*.

In testimony whereof I have signed my name to this application in the presence of two subscribing witnesses.

J. DENIS.

Witnesses:
 ALEX. O. M. PRINCE,
  4 *Trafalgar Square, Charing-Cross,*
 G. F. WARREN,
  17 *Gracechurch-street, London.*